United States Patent
Barsness et al.

(10) Patent No.: US 10,289,721 B2
(45) Date of Patent: May 14, 2019

(54) QUERY MANAGEMENT BASED ON AMOUNT OF DATA CHANGE

(71) Applicant: International Business Machines Corporation, Armonk, NY (US)

(72) Inventors: Eric L. Barsness, Pine Island, MN (US); Daniel E. Beuch, Rochester, MN (US); Brian R. Muras, Otsego, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 15/209,850

(22) Filed: Jul. 14, 2016

(65) Prior Publication Data

US 2018/0018369 A1 Jan. 18, 2018

(51) Int. Cl.
G06F 17/30 (2006.01)
(52) U.S. Cl.
CPC .............. *G06F 17/30469* (2013.01)
(58) Field of Classification Search
CPC .................................. G06F 17/30469
USPC ........................................ 707/719
See application file for complete search history.

(56) References Cited

U.S. PATENT DOCUMENTS

| | | | |
|---|---|---|---|
| 6,330,552 B1 * | 12/2001 | Farrar | G06Q 10/04 705/400 |
| 6,938,035 B2 * | 8/2005 | Driesch, Jr. | G06F 17/30469 |
| 7,127,449 B2 * | 10/2006 | Barsness | G06F 17/30457 707/999.101 |
| 8,417,690 B2 | 4/2013 | Poppe et al. | |
| 8,577,871 B2 | 11/2013 | Dageville et al. | |
| 8,677,375 B2 | 3/2014 | Uysal et al. | |
| 8,700,602 B2 | 4/2014 | Schapker et al. | |
| 8,745,032 B1 | 6/2014 | Brown et al. | |
| 8,849,797 B2 | 9/2014 | Denton et al. | |
| 8,930,344 B2 | 1/2015 | Kakarlamudi et al. | |
| 2004/0167873 A1 * | 8/2004 | Dettinger | G06F 17/30395 |
| 2005/0044063 A1 * | 2/2005 | Barsness | G06F 17/30457 |
| 2005/0192937 A1 * | 9/2005 | Barsness | G06F 9/50 |
| 2008/0052720 A1 * | 2/2008 | Barsness | G06F 9/50 718/104 |
| 2008/0065588 A1 * | 3/2008 | Aldrich | G06F 17/30463 |
| 2011/0022585 A1 * | 1/2011 | Barsness | G06F 17/30595 707/719 |
| 2011/0270822 A1 * | 11/2011 | Denton | G06F 17/30306 707/719 |
| 2012/0054175 A1 * | 3/2012 | Barsness | G06F 17/30477 707/719 |
| 2012/0054514 A1 * | 3/2012 | Barsness | G06F 1/329 713/320 |

(Continued)

*Primary Examiner* — Robert Stevens
(74) *Attorney, Agent, or Firm* — Patterson + Sheridan, LLP

(57) ABSTRACT

Techniques are described for estimating and managing an amount of data change for query processing. Embodiments of the present disclosure may generally receive a query to be executed and calculate an estimated amount of data change for the received query. If the initial estimated amount of data change for the received query does not exceed a threshold amount of data change, embodiments of the present disclosure may submit the query for execution. If the initial estimated amount of data change for the received query does exceed a threshold amount of data change, embodiments of the present disclosure may halt the execution of the query.

15 Claims, 9 Drawing Sheets

(56) References Cited

U.S. PATENT DOCUMENTS

| | | |
|---|---|---|
| 2012/0066554 A1 | 3/2012 | Ruiz |
| 2012/0136850 A1* | 5/2012 | Barsness ........... G06F 17/30501 707/720 |
| 2012/0150895 A1* | 6/2012 | Barsness ........... G06F 17/30424 707/769 |
| 2013/0024442 A1* | 1/2013 | Santosuosso ..... G06F 17/30424 707/720 |

* cited by examiner

QUERY MANAGEMENT BASED ON AMOUNT OF DATA CHANGE

BACKGROUND

The present application generally relates to database management, and more particularly, to managing query execution based on a determined amount of data that will be changed by executing the query.

DESCRIPTION OF THE RELATED ART

Databases are computerized data storage and retrieval systems. A relational database management system is a computer database management system (DBMS) that uses relational techniques for storing and retrieving data. An object-oriented programming database is a database that is congruent with the data defined in object classes and subclasses.

Regardless of the particular architecture, a requesting entity (e.g., an application or the operating system) in a DBMS requests access to a specified database by issuing a database access request. Such requests may include, for instance, simple catalog lookup requests or transactions and combinations of transactions that operate to read, change and add specified records in the database. These requests (i.e., queries) are often made using high-level query languages such as the Structured Query Language (SQL). Upon receiving such a request, the DBMS may execute the request against a corresponding database, and return any result of the execution to the requesting entity.

SUMMARY

Embodiments of the present disclosure provide a method, system, and computer program product for managing the execution of a query. The method, system and computer program product include receiving a query to be executed. Additionally, the method, system and computer program product include calculating an estimated amount of data change for the received query. The method, system and computer program product also include, upon determining the estimated amount of data change does not exceed a threshold amount of data change, executing the query by operation of one or more computer processors.

BRIEF DESCRIPTION OF THE DRAWINGS

So that the manner in which the above recited aspects are attained and can be understood in detail, a more particular description of embodiments of the present disclosure, briefly summarized above, may be had by reference to the appended drawings.

It is to be noted, however, that the appended drawings illustrate only typical embodiments of this invention and are therefore not to be considered limiting of its scope, for the present disclosure may admit to other equally effective embodiments.

DETAILED DESCRIPTION

Figure 1A:
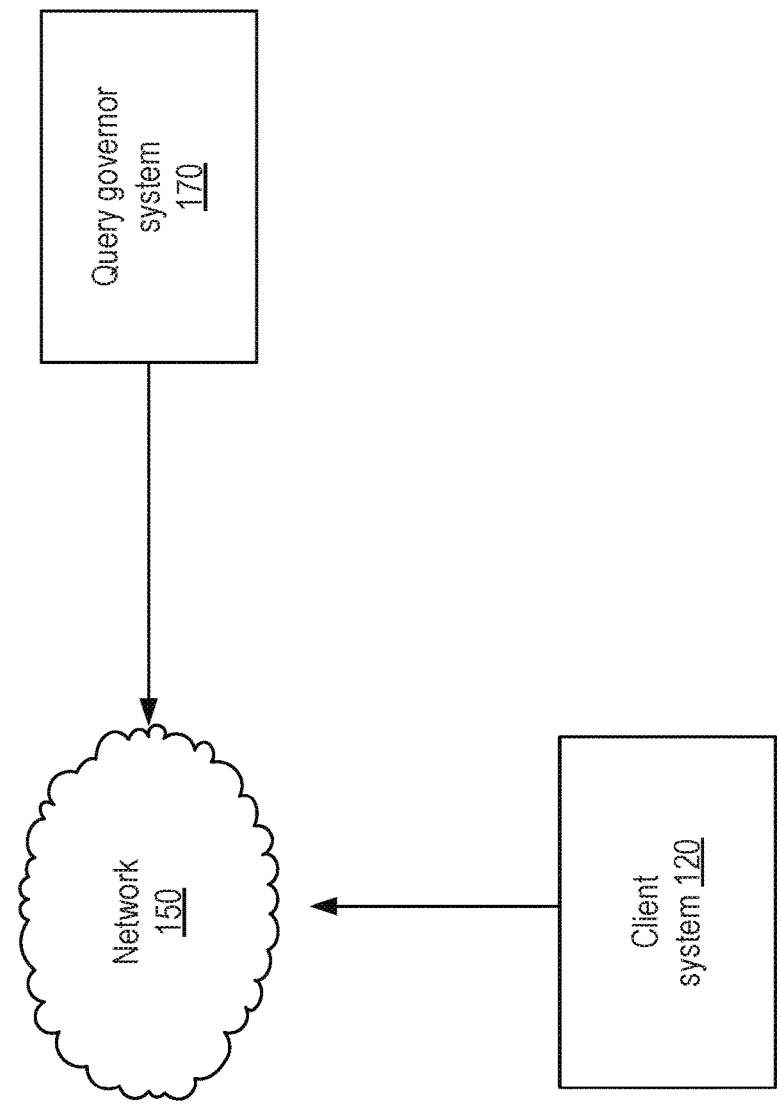
FIG. 1A-1B are block diagrams illustrating a networked system for estimating and managing an amount of data change for query processing, according to embodiments of the present disclosure.

Many DBMS include some form of query governor which generally controls how long queries may execute. For example, a query governor may enable a database administrator to have queries time out (i.e., execution of the query is halted) if a predetermined amount of time elapses before the execution completes. Such functionality enables the DBMS to prevent a single query from tying up the DBMS' resources for an excessive period of time.

Embodiments described herein provide techniques for managing query execution based on an estimated amount of data to be changed during execution of the query. For example, before the database executes the query, a query governor for the DBMS could calculate an estimated amount of data to be changed by the query, and if the estimated amount of data to be changed exceeds a threshold amount, the query governor may reject the query. Continuing this example, if the query governor determines the estimated amount of data is less than or equal to the threshold amount, the query governor may submit the query to the database for execution.

In addition to limiting the amount of data a particular query can change, a database administrator may wish to scale the threshold amount of data that can be changed during the execution of a query based on user class of a user submitting the query or a group to which the user belongs. For example, the query governor could determine that the threshold amount is a relatively large amount of data for a query submitted by an administrator, and could determine that the threshold amount is a relatively small amount of data for another query submitted by a standard user. In one embodiment, the query governor can scale the threshold amount of data based on the identity of the user submitting the query. For example, the query governor could be configured with a rule setting a specific threshold amount of data that can be changed by the execution of queries submitted by the user account "jd12345."

However, the business may not want to allow users below an administrator to issue a query whose execution deletes greater than 50 rows. As such, if the query governor determines an identification of the user sending the query, calculates an estimated amount of data to be changed by the query, and determines that the estimated amount of data to be changed exceeds a non-authorized user threshold amount, the query governor may reject the received query for execution. As such, having determined the identity of a user (or user type) issuing a query, the query governor may calculate an estimated amount of data to be changed by the query. If the estimated amount exceeds a user-specific threshold, the query governor may prevent execution of the received query.

Alternatively, a business may scale the threshold amount of data change based on the current time. For example, the business may wish to scale down the threshold amount of data change during busier time periods of the day. For example, the business may scale down the threshold amount of data change during all Mondays from 1:00 P.M. to 4:00 PM. Thus, if a query is received at 2:30 P.M. on a Monday and it is estimated that the query's execution updates greater than 100 rows in a database, the query governor may reject the received query for execution. As such, scaling the threshold amount of data change during specified periods of time aid in limiting query traffic.

Embodiments of the present disclosure generally calculate an estimated amount of data change for the received query. If the estimated amount of data change for the received query exceeds a threshold amount of data change, embodiments of the present disclosure may reject the query for execution. Upon determining that the estimated amount of data change does not exceed the threshold amount of data change, embodiments of the present disclosure may begin execution of the query.

In the following, reference is made to embodiments of the present disclosure. However, it should be understood that the present disclosure is not limited to specific described embodiments. Instead, any combination of the following features and elements, whether related to different embodiments or not, is contemplated to implement and practice the present disclosure. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s). Likewise, reference to "the present disclosure" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the DBMS) available in the cloud. For example, the DBMS could execute on a computing system in the cloud and receive user requests (e.g., queries) to access databases managed by the DBMS. In such a case, a query governor may calculate an estimated amount of data change for a received request, and then determine whether to submit the query to the DBMS for execution based on the estimated amount of data. Doing so allows a user to access the database data from any computing system attached to a network connected to the cloud (e.g., the Internet).

Figure 1B:
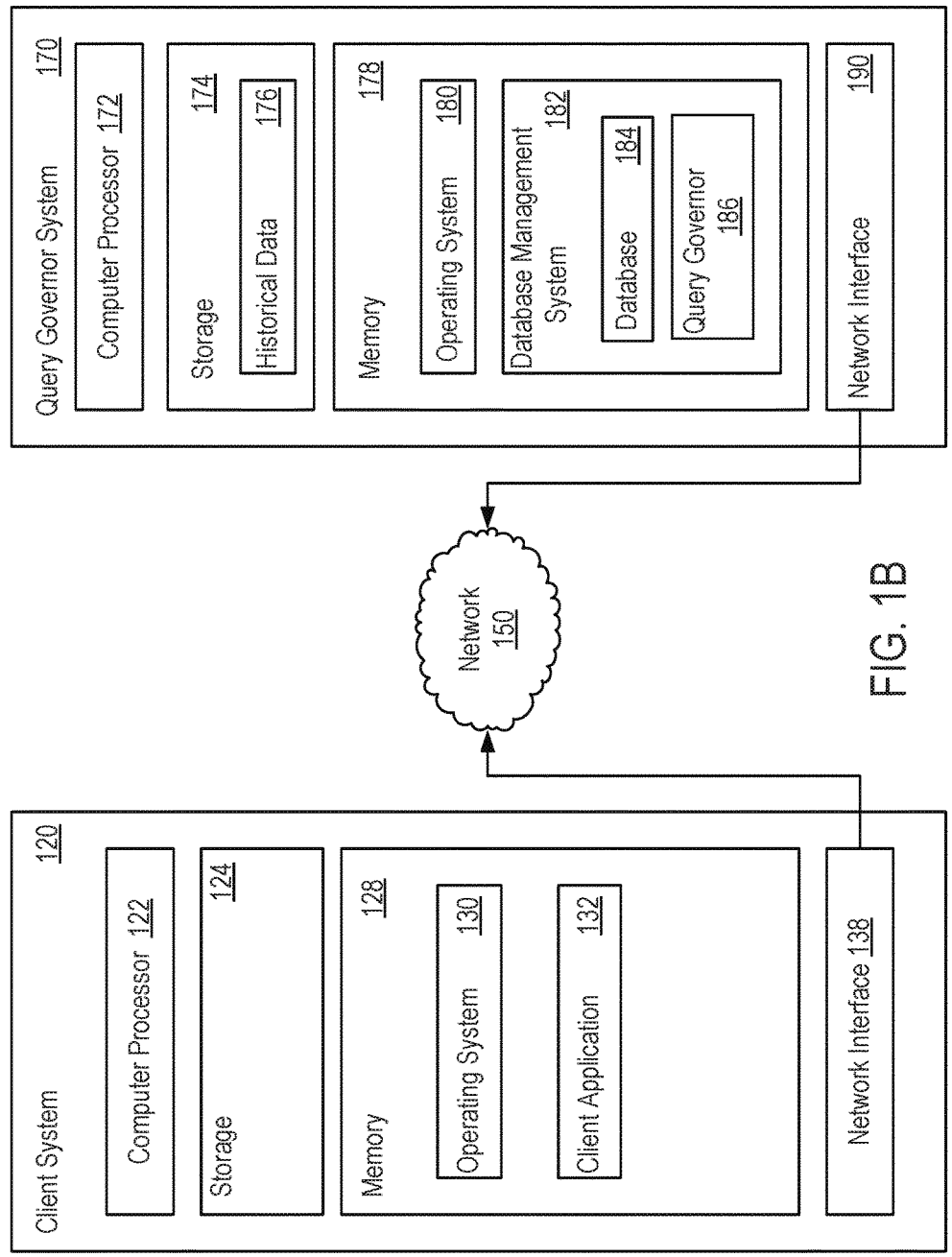

FIG. 1A-1B are block diagrams illustrating a networked system for estimating and managing an amount of data change for query processing, according to embodiments of the present disclosure. As shown, FIG. 1A is a block diagram illustrating a networked system for estimating and managing an amount of data change for query processing, according to one embodiment of the present disclosure. In the depicted embodiment, the system 100 includes a client system 120 and a database server 170, connected by a network 150. Generally, the client system 120 may submit requests (i.e., queries) over the network 150 to a DBMS running on the database server 170. The term "query" specifies a set of commands for retrieving data from a database. Queries may take the form of a command language, such as the Structured Query Language (SQL), and enable programmers and programs to access data within the database. For instance, queries can be used to select, insert, update, find out the location of data, and so forth. Generally speaking, any requesting entity can issue queries against data in a database. For example, software applications (such as by an application running on the client system 120), and operating systems may submit queries to the database. These queries may be predefined (i.e., hard coded as part of an application) or may be generated in response to input (e.g., user input). Upon receiving the request, the DBMS on the database server 170 may execute the request against a database specified in the request, and then return the result of the executed request.

However, it may be desirable for the database server 170 to only process certain requests it receives. That is, if a particular request would change an excessive amount of data, the database server 170 may wish to reject this query. According to embodiments of the present disclosure, the database server 170 may include a query governor configured to determine which received requests the DBMS should execute. In one embodiment of the present disclosure, upon receiving a query from the client system 120, the query governor may calculate an estimated amount of data change for the query. If the query governor then determines that the estimated amount of data change exceeds a predetermined threshold amount, the query governor may refuse the query for processing. For example, assume that the threshold amount of data change is 100 rows of data. If the query governor receives a query and estimates it will change 150 rows of data, the query governor may refuse the query for processing, and may notify the client system 120 accordingly.

Furthermore, if the query governor determines that the estimated amount of data does not exceed the threshold amount, the query governor may submit the query to the DBMS for processing. In some embodiments, once the processing of the query has begun, the query governor may periodically calculate an updated estimated amount of data change for the query. The query governor may also periodically compare the updated estimated amount of data change for the query against the threshold value to determine whether processing of the query will continue Referring now to FIG. 1B, FIG. 1B is a block diagram of a networked computer system configured to estimate and manage an amount of data change for query processing, according to one embodiment of the present disclosure. As shown, the system 110 contains a client system 120 and a database server 170. The client system 120 contains a computer processor 122, storage media 124, memory 128 and a network interface 138. Computer processor 122 may be any processor capable of performing the functions described herein. The client system 120 may connect to the network 150 using the network interface 138. Furthermore, as will be understood by one of ordinary skill in the art, any computer system capable of performing the functions described herein may be used.

In the pictured embodiment, memory 128 contains an operating system 130 and a client application 132. Although memory 128 is shown as a single entity, memory 128 may include one or more memory devices having blocks of memory associated with physical addresses, such as random access memory (RAM), read only memory (ROM), flash memory or other types of volatile and/or non-volatile memory. The client application 132 is generally capable of generating database queries. Once the client application 132 generates a query, the query may be submitted over the network 150 to a DBMS (e.g., DBMS 182) for execution. The operating system 130 may be any operating system capable of performing the functions described herein.

The database server 170 contains a computer processor 172, storage media 174, memory 178 and a network interface 190. Computer processor 172 may be any processor capable of performing the functions described herein. Storage media 174 contains historical data 176. The historical data 176 may include data and metadata describing previously executed queries. For example, in one embodiment of the present disclosure, the historical data 176 includes data about the amount of data changed from previously executed queries. The database server 170 may connect to the network 150 using the network interface 190. Furthermore, as will be understood by one of ordinary skill in the art, any computer system capable of performing the functions described herein may be used.

In the pictured embodiment, memory 178 contains an operating system 180 and a DBMS 182. Although memory 178 is shown as a single entity, memory 178 may include one or more memory devices having blocks of memory associated with physical addresses, such as random access memory (RAM), read only memory (ROM), flash memory or other types of volatile and/or non-volatile memory. The DBMS 182 contains a database 184 and a query governor 186. The operating system 180 may be any operating system capable of performing the functions described herein.

Generally, the client application 132 may generate and submit queries to the DBMS 182 using the network 150. According to embodiments of the present disclosure, once the DBMS 182 receives a query, the query governor 186 may calculate an estimated amount of data change for the query. Such a calculation may be based on values in the received query. In one embodiment, the DBMS 182 may keep statistics on tables such as how many rows per key or how many unique values are in a given column. These statistics are used to estimate the amount of data change for a given query. For example, given the query Update table1 Set column2=?, where xyz=?

if column1 is unique, it is obvious that only one record is generated. If the database statistics are up to date, and 10 is the highest count for any value in column1, then the estimated amount of data change would be between 0 and 10. In another example, the query governor 186 may determine that an UPDATE statement from a particular table in the database 184 will update the values for 150 rows of data when executed. Additionally, the calculation may be based on collected metadata describing the received query. Furthermore, the query governor 186 may use the historical data 176 in calculating the estimated amount of data change for the received query. Thus, for example, the historical data 176 may contain data indicating that the DBMS 182 has previously processed a similar (or identical) query to the received query. In such a case, the query governor 186 may calculate the estimated amount of data change for the received query based on a recorded estimated amount of data change for the previously processed query stored in the historical data 176. Similarity may be determined between a received query and a previously processed query stored in the historical database. For example, consider the given query update table1 set column2=? where xyz=?

where, "?" may be substituted with an actual value. A first query could come in with where xyz=1, and then a second invocation of the query could be where xyz=2. Although the values of "?" differ, these would be the same query. Likewise, the query "update table1 set column2=?, column3=? where xyz=?" could be considered the same query because nothing fundamental about the estimates would change; only additional fields within a row are updated. Of course, the above examples are merely for illustrative purposes, and one of ordinary skill in the art will recognize that other data, metadata and historical data, as well as combinations therebetween, may be used as well.

Figure 2:
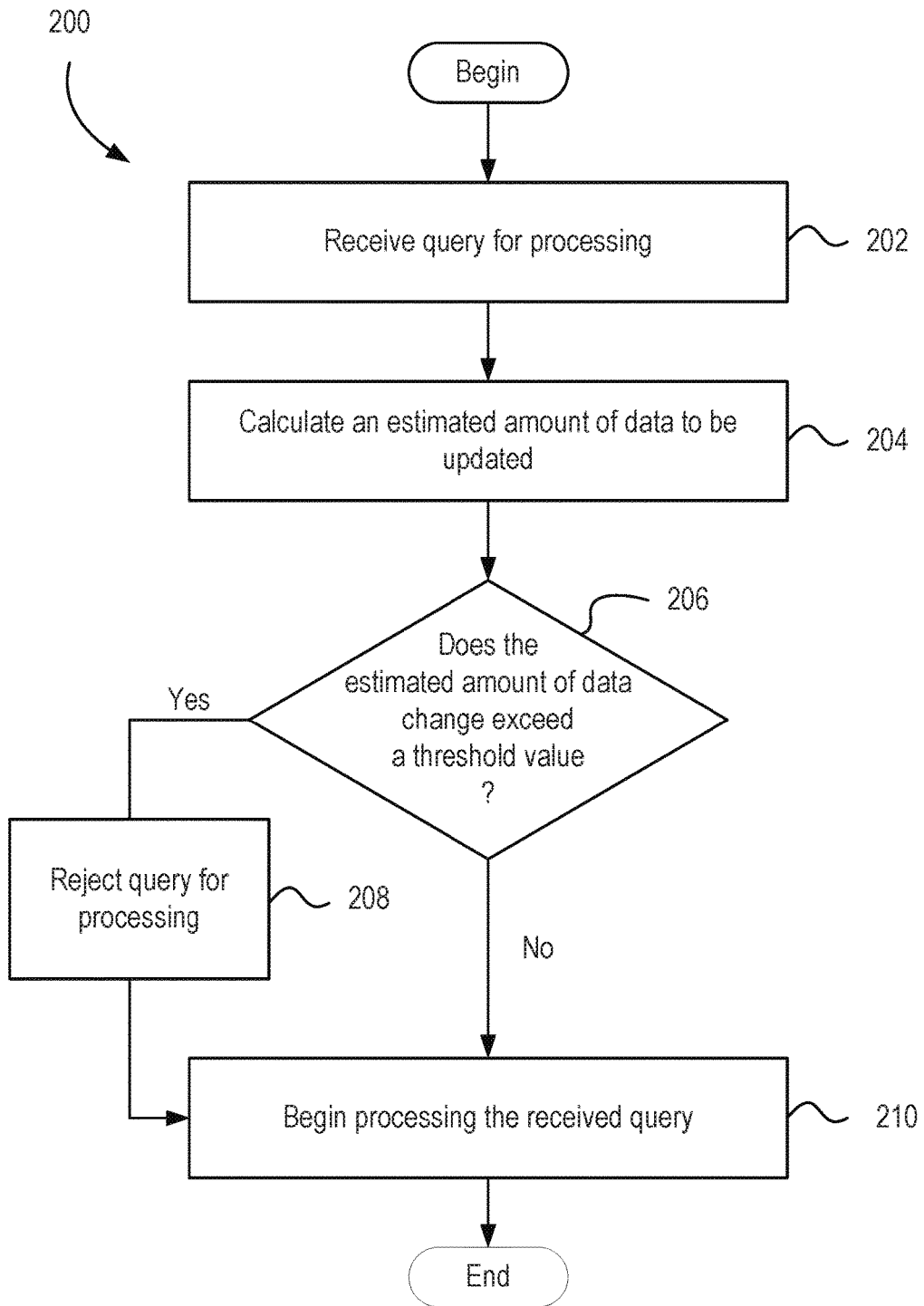
FIG. 2 is a flow diagram illustrating a method of managing query execution, according to one embodiment of the present disclosure.

FIG. 2 is a flow diagram illustrating a method of managing query execution, according to one embodiment of the present disclosure. As shown, the method 200 begins at step 202, where the query governor 186 receives a query for processing. Upon receiving the query, the query governor 186 calculates an estimated amount of data change for executing the received query (step 204). In one embodiment, calculating an estimated amount of data change for executing the received query includes calculating an estimated amount of rows to be changed by the query execution. In another embodiment, calculating an estimated amount of data change for executing the received query includes calculating an estimated amount of bytes of data to be changed by the query execution. In yet another embodiment, calculating an estimated amount of data change for executing the received query for executing the received query includes calculating a percentage amount of data, such as a percentage of the number of rows in a table or the percentage of information in a given database, to be changed by the query execution. As discussed above, the estimated amount of data change may be calculated using data contained in the received query, metadata describing the received query, or historical data 176. In yet another embodiment, calculating an estimated amount of data change for executing the received query for executing the received query includes calculating a percentage amount of data to be changed by the query execution.

Once the estimated amount of data change value is calculated, the query governor 186 determines whether the estimated amount of data change exceeds a threshold amount of data change (step 206). In one embodiment of the present disclosure, the threshold amount of data change is a preset (e.g., by a database administrator) amount of data change that is used for all queries received by the DBMS 182. In another embodiment of the present disclosure, the threshold amount of data change is based on the type of query received by the DBMS 182. In one embodiment, the query governor 186 is configured to calculate different thresholds for different types of queries received. As an example, the query governor 186 may calculate a first threshold amount of data change of an UPDATE statement and a second threshold amount of data change for the DELETE statement. The first threshold amount of data change may be greater than the second amount of data change because the system may wish to limit an amount of data to be deleted compared to an amount of data to be updated in a given query. Furthermore, the above examples are for illustrative purposes only, and one of ordinary skill in the art will quickly recognize that other factors may be used for calculating the threshold amount of data change of data change as well.

If the query governor 186 determines that the estimated amount of data change exceeds the threshold amount of data change, the query governor 186 rejects the query for processing (step 210). The query governor 186 may further notify the client application 132 that submitted the query. For example, the query governor 186 may return a message to the client application 132 that submitted the query, indicating that the query was rejected for processing because of the estimated amount of data change. The query governor 186 may also temporarily halt execution of the query. For example, the query governor 186 may halt the execution of the query and execute the query at a later time. In another example, the query governor 186 may also queue the query to be executed during a non-peak time. If instead the query governor 186 determines that the estimated amount of data change does not exceed the threshold amount of data change, the query governor 186 submits the query for processing (step 212). Once the query is submitted for processing, or once the query governor 186 rejects the query for processing, the method 200 ends.

Figure 3:
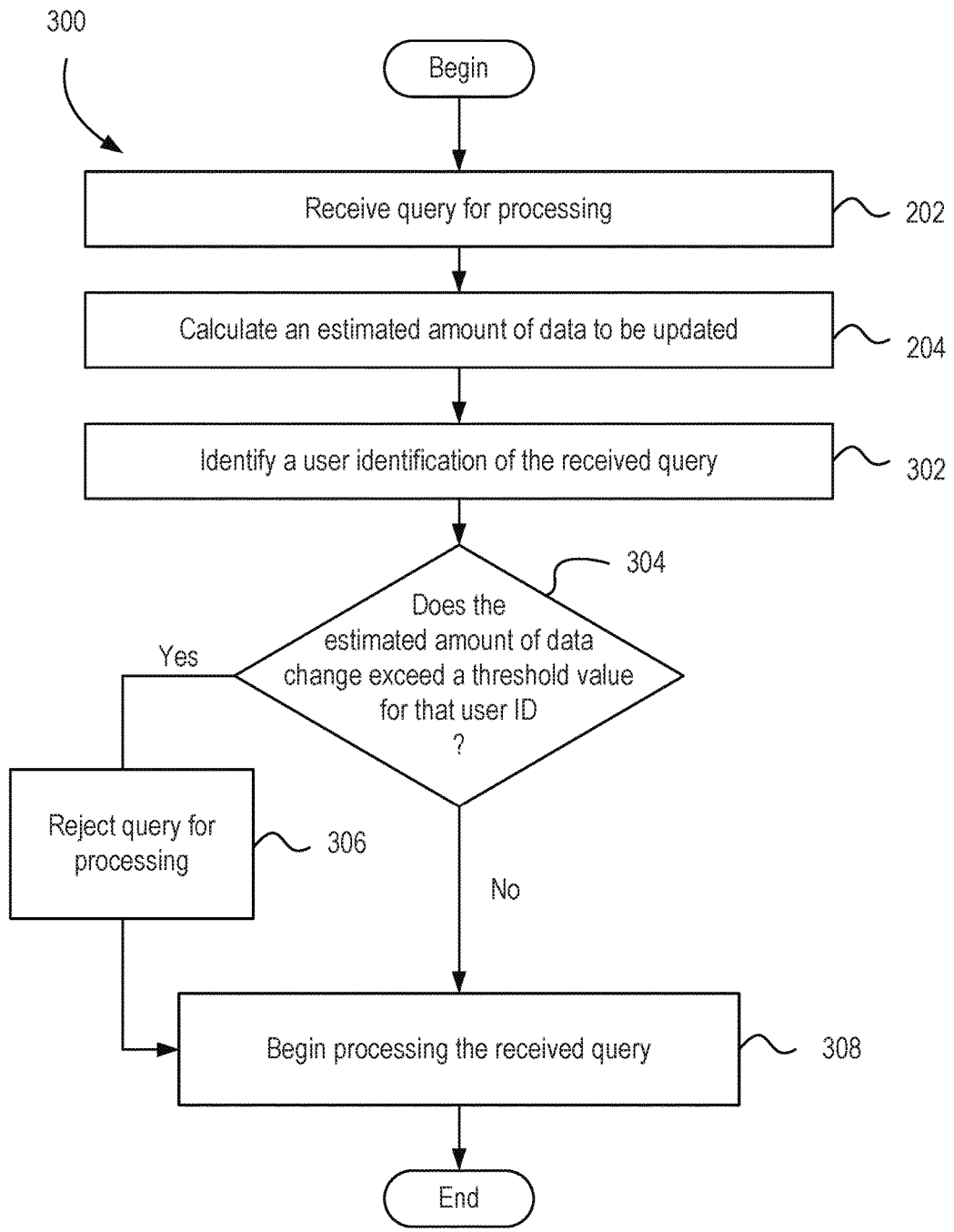
FIG. 3 is a flow diagram illustrating a method of managing query execution, according to one embodiment of the present disclosure.

FIG. 3 is a flow diagram illustrating a method of managing query execution, according to another embodiment of the present disclosure. As shown, the method 300 includes steps 202 and 204 from method 200. Once the query governor 186 calculates the estimated amount of data change, the query governor 186 identifies a user issuing the query (step 302). The query governor 186 may identify the user issuing the query or the group to which the user belongs. For example, the query governor 186 may identify the user as the network administrator or an employee in the administration group. The user identification may be received with the query or mined from the metadata received with the query.

Once the estimated amount of data change value is calculated, the query governor 186 determines whether the estimated amount of data change for the identified user exceeds a threshold amount of data change (step 304). For example, the query governor 186 may determine that an administrator is given permission to execute a DELETE statement from a particular table in the database 184 that will delete no greater than 500 rows of data from the particular table. On the other hand, the query governor 186 may determine that a user from a group of first-year employees is given permission to query a DELETE statement from a particular table in the database 184 that will delete no greater than 50 rows from the particular table.

If the query governor 186 determines that the estimated amount of data change exceeds the threshold amount of data change for the identified user, the query governor 186 rejects the query for processing (step 306). The query governor 186 may further notify the client application 132 that submitted the query. For example, the query governor 186 may return a message to the client application 132 that submitted the query, indicating that the query was rejected for processing because of the estimated amount of data change. If instead the query governor 186 determines that the estimated amount of data change for the identified user does not exceed the threshold amount of data change, the query governor 186 submits the query for processing (step 308). Once the query is submitted for processing, or once the query governor 186 rejects the query for processing, the method 300 ends.

Figure 4:
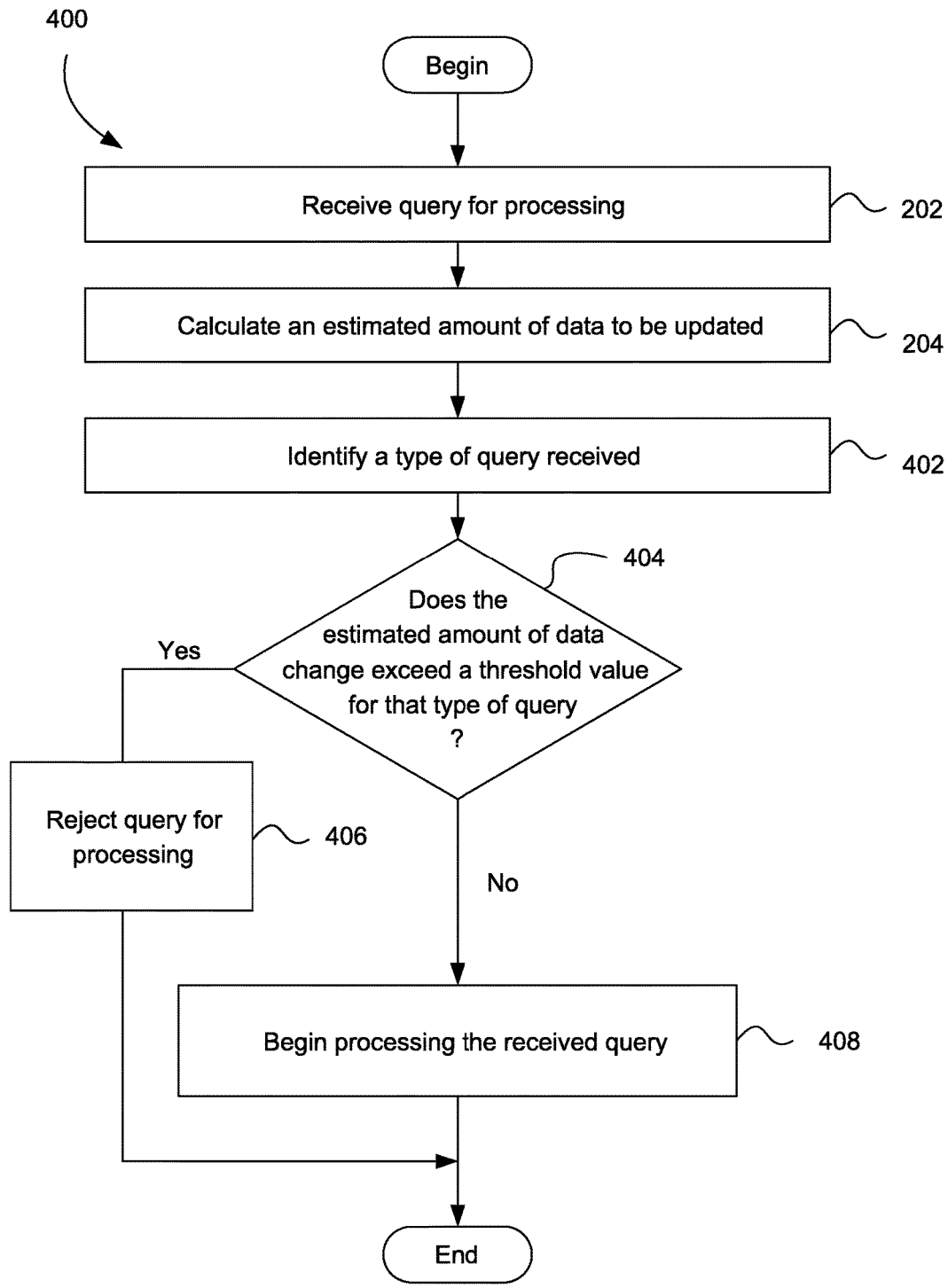
FIG. 4 is a flow diagram illustrating a method of managing query execution, according to one embodiment of the present disclosure.

FIG. 4 is a flow diagram illustrating a method of managing query execution, according to another embodiment of the present disclosure. As shown, the method 400 includes steps 202 and 204 from method 200. Once the query governor 186 calculates the estimated amount of data change, the query governor 186 identifies a type of query received (step 402). For example, the query governor 186 may identify the received query as an UPDATE statement, a DELETE statement, an INSERT INTO statement, an ALTER TABLE statement, or any other statement in the query.

Once the estimated amount of data change value is calculated and the type of query is identified, the query governor 186 determines whether the estimated amount of data change for the identified query exceeds a threshold amount (step 404). For example, the query governor 186 may determine that for a DELETE statement, the threshold amount may be limited to no greater than 50 rows of data from the particular table. On the other hand, the query governor 186 may determine that for a UPDATE statement, the threshold amount may be limited to no greater than 100 rows of data from a particular table.

If the query governor 186 determines that the estimated amount of data change exceeds the threshold amount of data change for the identified query, the query governor 186 rejects the query for processing (step 406). The query governor 186 may further notify the client application 132 that submitted the query. For example, the query governor 186 may return a message to the client application 132 that submitted the query, indicating that the query was rejected for processing because of the estimated amount of data change. If instead the query governor 186 determines that the estimated amount of data change for the identified query does not exceed the threshold amount of data change, the query governor 186 submits the query for processing (step 408). Once the query is submitted for processing, or once the query governor 186 rejects the query for processing, the method 400 ends.

Figure 5:
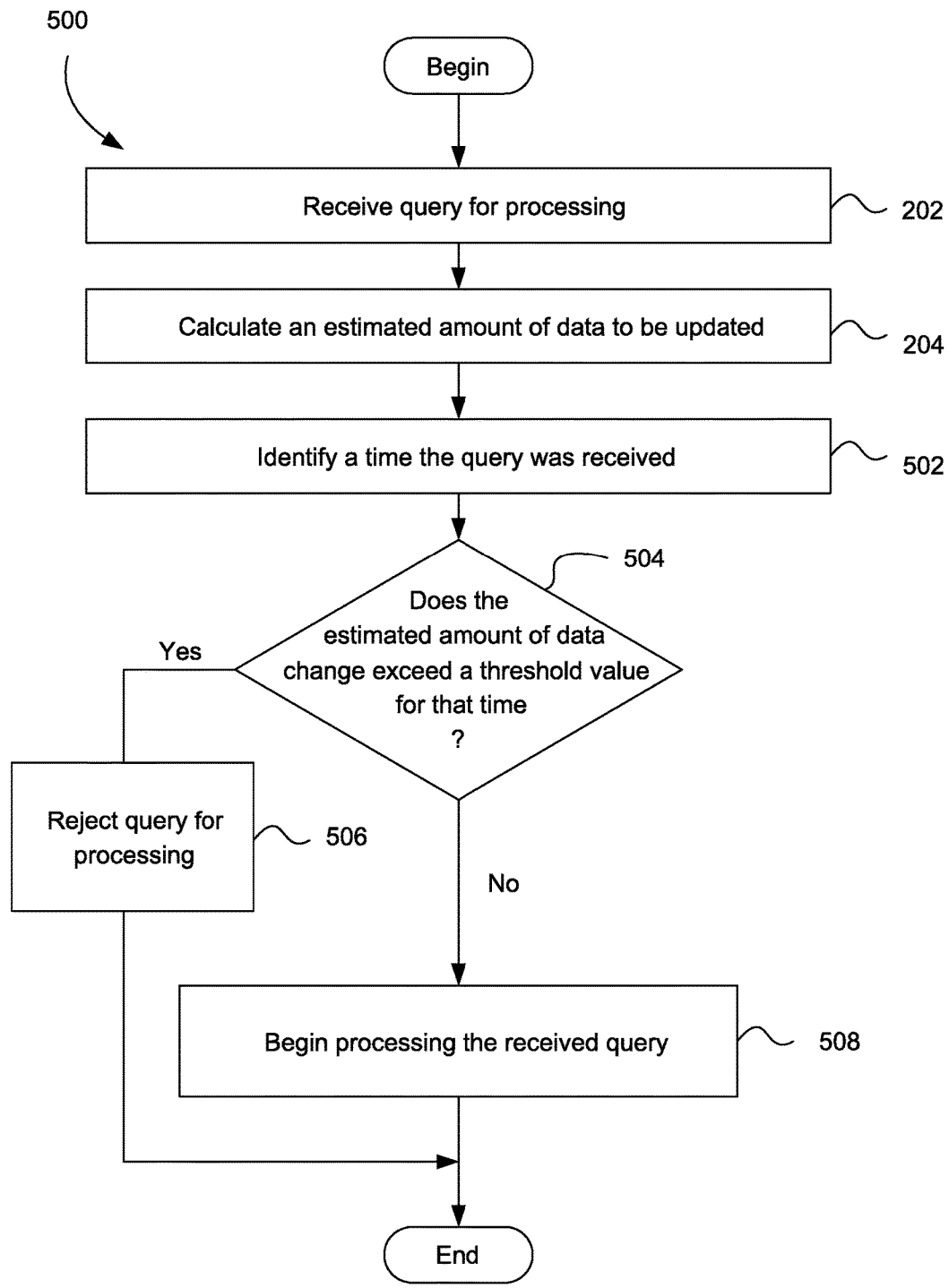
FIG. 5 is a flow diagram illustrating a method of managing query execution, according to one embodiment of the present disclosure.

FIG. 5 is a flow diagram illustrating a method of managing query execution, according to another embodiment of the present disclosure. As shown, the method 500 includes steps 202 and 204 from method 200. Once the query governor 186 calculates the estimated amount of data change, the query governor 186 identifies a time when the query is received (step 502). For example, the query governor 186 may identify the time the query was received as well as the date the query is received.

Once the estimated amount of data change value is calculated and the time the query was received is identified, the query governor 186 determines whether the estimated amount of data change for the query at the identified time exceeds a threshold amount (step 504). For example, the query governor 186 may determine that for weekdays between the hours of 2:00 PM and 4:30 PM, the threshold amount of any query may be 100 MB of data. On the other hand, the query governor 186 may determine that for weekends, the threshold amount of data any query can change is no greater than 2 GB. Additionally, method 500 may be combined with any of methods 200-400. For example, the query governor 186 may also determine the type of query received. In one embodiment, the threshold amount of data change for all DELETE statements received on Mondays at 2:30 PM may not exceed 750 MB of data and may not exceed greater than 100 rows of data.

If the query governor 186 determines that the estimated amount of data change exceeds the threshold amount of data change for the identified time, the query governor 186 rejects the query for processing (step 506). The query governor 186 may further notify the client application 132 that submitted the query. For example, the query governor 186 may return a message to the client application 132 that submitted the query, indicating that the query was rejected for processing because of the estimated amount of data change. If instead the query governor 186 determines that the estimated amount of data change at the identified time does not exceed the threshold amount of data change, the query governor 186 submits the query for processing (step 508). Once the query is submitted for processing, or once the query governor 186 rejects the query for processing, the method 500 ends.

Figure 6:
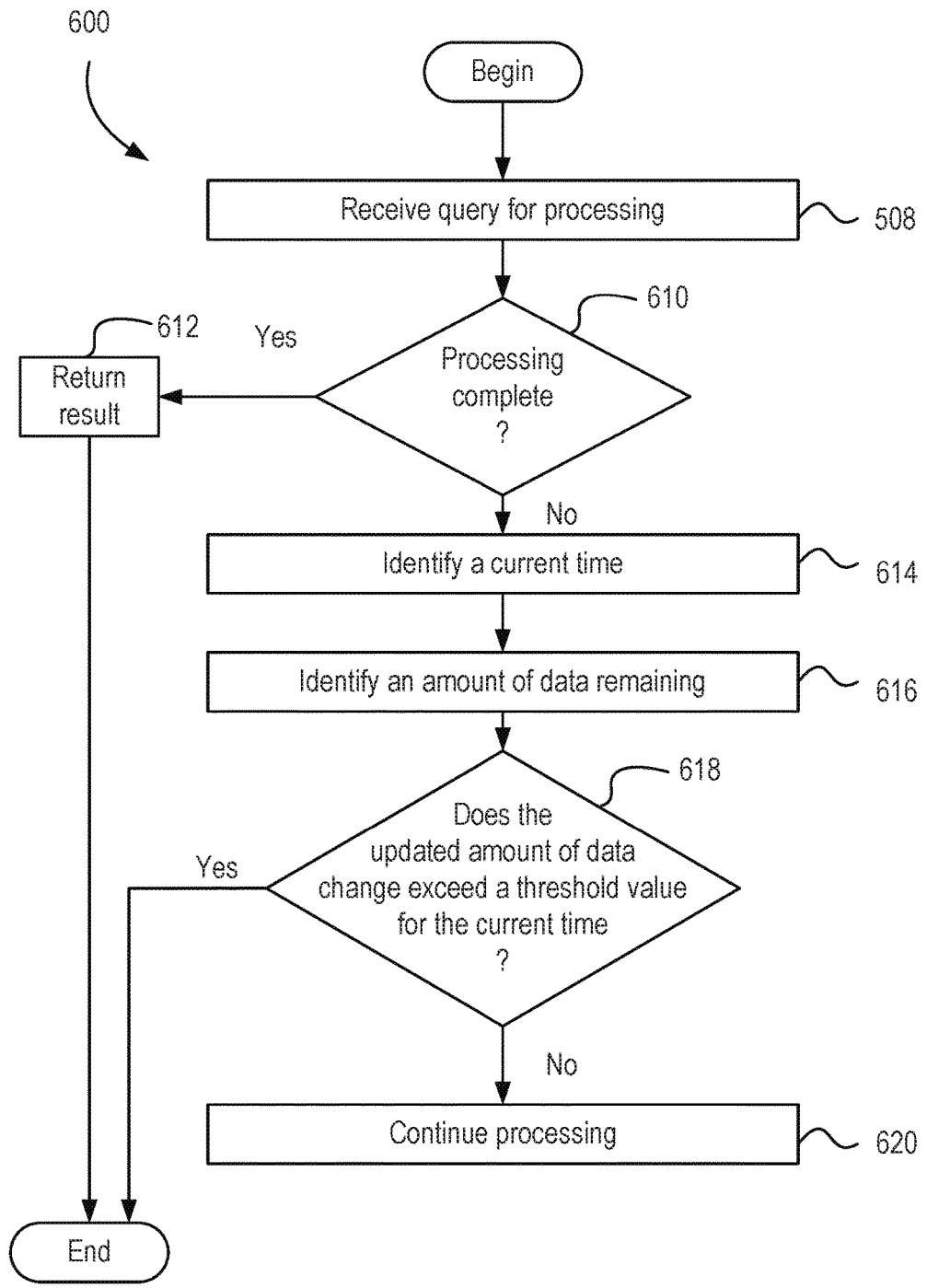
FIG. 6 is a flow diagram illustrating a method of managing query execution, according to one embodiment of the present disclosure.

FIG. 6 is a flow diagram illustrating a method 600 of managing query execution, according to another embodiment of the present disclosure. Method 600 begins at step 508, where the DBMS 182 begins processing the received query. For example, the DBMS 182 may begin processing the query after the completion step 618 of the method 200 discussed above. Once the execution of the query has begun, the query governor 186 determines whether the execution of the query has completed (step 610). If the execution of the query has completed, the DBMS 182 returns the result of executing the query (step 612). Generally, the DBMS 182 will return the result produced from executing the query to whatever entity submitted the query. Thus, for example, if the query was submitted by a client application 132, the DBMS 182 will return the result to the client application 132. If instead the query governor 186 determines that execution of the query has not completed, the query governor 186 identifies a current time of the query (step 614).

The query governor 186 then calculates an updated amount of data left that is to be updated (step 616). The query governor 186 then determines if the updated amount of data left to be updated exceeds a threshold amount of data change (step 618). If the query governor 186 determines that the updated amount of data left to be updated exceeds the threshold amount of data change for the updated time, the query governor 186 halts the execution of the query and rejects the query for processing. As used herein, halting the execution of the query may mean either suspending the execution or terminating the execution of the query. When the execution is suspended, the state of the query execution is saved, such that the DBMS may resume processing the query from the point the query was suspended. If the execution is terminated, the DBMS would resume processing the query from the beginning. For example, a query that begins at 5:30 AM that will updated 200 rows of data may not exceed a threshold amount of data change for the time of 5:30 AM; however, if the query takes long to process, and at 9:00 AM the updated estimated amount of data change exceeds the threshold amount of data change for 9:00 AM, then the query governor 186 may halt the execution of the query. The query governor 186 may subsequently resume the query when the estimated amount of data change is less than the threshold amount. For example, the query governor 186 may resume execution of the query at 4:30 PM because the estimated amount of data to be changed is less than a threshold amount of data change for the time of 4:30 PM. In another example, the query governor 186 may place the query in a queue to be run at a later time. Alternatively, the query governor 186 may subsequently reject the query for processing.

On the other hand, if the query governor 186 determines the updated estimated amount of data left to be updated does not exceed the threshold amount of data change for the updated time, then the execution of the query continues (step 620), and the method begins again at step 508, where the query governor again determines whether the query has finished executing. Once the DBMS 182 returns the result of the query, or once the query governor halts the execution of the query and rejects the query for execution, the method 600 ends.

Figure 7:
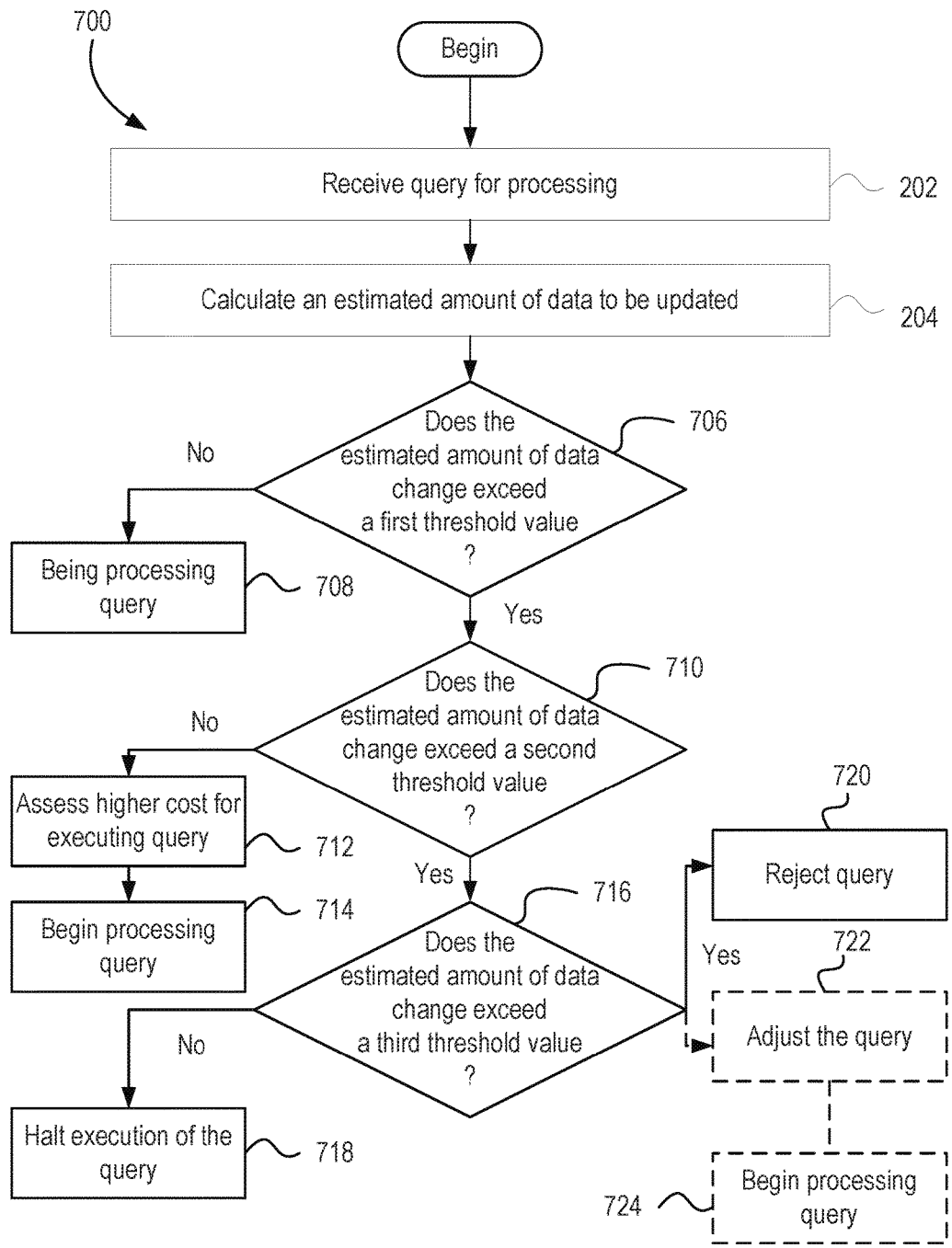
FIG. 7 is a flow diagram illustrating a method of managing query execution, according to one embodiment of the present disclosure.

FIG. 7 is a flow diagram illustrating a method 700 of managing query execution, according to one embodiment of the present disclosure. As shown, the method 700 includes steps 202 and 204 from method 200. Once the query governor 186 calculates the estimated amount of data change, the query governor 186 determines whether the estimated amount of data change exceeds a first threshold amount of data change (step 706). If the estimated amount of data change does not exceed the first threshold amount of data change, then the query governor 186 begins processing the received query (step 708). If the query governor 186 does exceed the first threshold amount of data change, then the query governor 186 determines whether the estimated amount of data change is less than a second threshold amount of data change (step 710). For example, the query governor determines whether the estimated amount of data change is between the first threshold amount of data change and the second threshold amount of data change.

If the query governor 186 determines that the estimated amount of data change exceeds the first threshold amount of data change but does not exceed the second threshold amount of data change, then the query governor 186 assesses a higher cost for executing the query (step 712). This may be attributed to the query taking up more resources than a query that is estimated to change less data. The query governor 186 then begins processing the query (step 714). If the query governor does exceed the second threshold amount of data change, then the query governor 186 determines whether the estimated amount of data change is less than a third threshold amount of data change (step 716). For example, the query governor determines whether the estimated amount of data change is between the second threshold amount of data change and the third threshold amount of data change.

If the query governor 186 determines that the estimated amount of data change exceeds the second threshold amount of data change but does not exceed the third threshold amount of data change, then the query governor 186 may halt execution of the query, and queue the query for processing while the DBMS is idle (step 718). Thus, the query governor 186 may still wish to execute the received query, but at a later time. If the query governor 186 determines that the estimated amount of data change exceeds the third threshold amount of data change, then the query governor 186 rejects the query for processing (step 720). Alternatively, in another embodiment, if the query governor 186 determines that the estimated amount of data change exceeds the third threshold amount of data change, then the query governor 186 may adjust the query such that the query does not change an amount of data greater than the third threshold amount of data (step 722). The query governor 186 may then begin processing the received query 186 (step 724).

Figure 8:
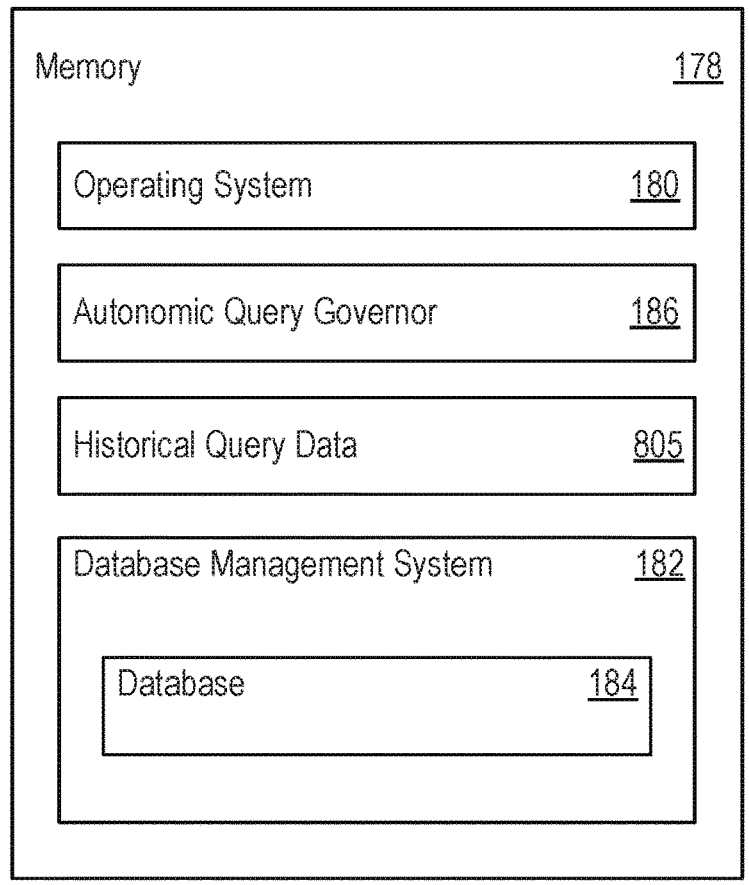
FIG. 8 is a block diagram illustrating a computer memory of the query governor system of FIGS. 1A-1B, according to one embodiment of the present disclosure

FIG. 8 is a block diagram illustrating an exemplary computer memory of the query governor system of FIGS. 1A-1B, according to one embodiment of the present disclosure. As shown, the memory 178 contains an operating system 180, a query governor 186, historical query data 805, and a DBMS 182. The DBMS 182 includes a database 184. The historical query data 805 generally contains data on the amount of data a particular query typically updates when executed. The query governor 186 may use the historical query data 805 to calculate an estimated amount of data change for executing a particular query.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the present disclosure may be devised without departing from the basic scope thereof, and the scope thereof is determined by the claims that follow.

What is claimed is:

1. A method, comprising:
   receiving, at a database management system (DBMS), a query to be executed against a database;
   calculating, by a query governor component of the DBMS, an estimated amount of data within the database that will be changed in executing the query against the database;
   determining a threshold amount of data to use in evaluating the query, based on a query type of the query, wherein the query type is one of a plurality of predefined query types recognized by the DBMS;
   upon determining, by the query governor component, that the estimated amount of data change for the query does not exceed the threshold amount of data, beginning execution of the query against the database;
   during execution of the query, calculating an updated amount of data that has been changed during execution of the query; and
   upon determining that the updated amount of data change exceeds a second threshold amount of data change, halting execution of the query.

2. The method of claim 1, further comprising:
   receiving a second query to be executed against the database;
   calculating an estimated amount of data within the database that will be changed in executing the second query against the database;
   determining a threshold amount of data based on one or more attributes of the second query;
   upon determining that the estimated amount of data change for the second query exceeds the threshold amount of data, determining another threshold amount of data based on one or more attributes of the second query; and
   upon determining that the estimated amount of data change for the second query does not exceed the other estimated amount of data change, charging a higher monetary cost for executing the second query.

3. The method of claim 1, further comprising:
   receiving a second query to be executed against the database;
   calculating an estimated amount of data within the database that will be changed in executing the second query against the database;
   upon determining that the estimated amount of data change for the second query exceeds a threshold amount of data, determining another threshold amount of data based on one or more attributes of the second query; and
   upon determining that the estimated amount of data change for the second query does exceed the other estimated amount of data change, rejecting the second query.

4. The method of claim 1, wherein calculating the estimate amount of data further comprises:
   upon determining that the estimated amount of data change for the query exceeds the threshold amount of data, determining another threshold amount of data based on one or more attributes of the query; and
   upon determining that the estimated amount of data change for the query does not exceed the other estimated amount of data change, adjusting the query such that execution of the query changes an amount of data within the database no greater than the other threshold amount of data change.

5. The method of claim 1, wherein determining the threshold amount of data to use in evaluating the query is further based on a user identifier associated with a user that issued the query to be executed.

6. The method of claim 1, further comprising:
   receiving a second query to be executed against a database;
   calculating an estimated amount of data that will be changed in executing the second query against the database;
   determining a threshold amount of data based on one or more attributes of the second query;
   upon determining that the estimated amount of data change for the second query exceeds the threshold amount of data, determining another threshold amount of data based on one or more attributes of the second query; and
   upon determining that the estimated amount of data change for the second query does not exceed the other estimated amount of data change, halting execution of the second query and scheduling the second query to be processed at a later time.

7. The method of claim 1, wherein determining the threshold amount of data change further comprises:
   determining a time the query is received; and
   scaling the threshold amount of data change, based on the determined time.

8. A system, comprising:
   a computer processor; and
   a memory containing a program that, when executed on the computer processor, performs an operation for managing the execution of a query, comprising:
      receiving, at a database management system (DBMS), a query to be executed against a database;
      calculating, by a query governor component of the DBMS, an estimated amount of data within the database that will be changed in executing the query against the database;
      determining a threshold amount of data to use in evaluating the query, based on a query type of the query, wherein the query type is one of a plurality of predefined query types recognized by the DBMS;
      upon determining, by the query governor component, that the estimated amount of data change for the query does not exceed the threshold amount of data, beginning execution of the query against the database;
      during execution of the query, calculating an updated amount of data that has been changed during execution of the query; and
      upon determining that the updated amount of data change exceeds a second threshold amount of data change, halting execution of the query.

9. The system of claim 8, further comprising:
   receiving a second query to be executed against a database;
   calculating an estimated amount of data that will be changed in executing the second query against the database;
   determining a threshold amount of data based on one or more attributes of the second query;
   upon determining that the estimated amount of data change for the second query exceeds the threshold amount of data, determining another threshold amount of data based on one or more attributes of the second query; and upon determining that the estimated amount of data change for the second query does not exceed the other estimated amount of data change, charging a higher monetary cost for executing the second query.

10. The system of claim 8, further comprising:

receiving a second query to be executed against a database;

calculating an estimated amount of data that will be changed in executing the second query against the database;

determining a threshold amount of data based on one or more attributes of the second query;

upon determining that the estimated amount of data change for the second query exceeds the threshold amount of data, determining another threshold amount of data based on one or more attributes of the second query; and upon determining that the estimated amount of data change for the second query does not exceed the other estimated amount of data change, charging a higher monetary cost for executing the second query.

11. The system of claim 8, wherein calculating the estimate amount of data further comprises:

upon determining that the estimated amount of data change for the query exceeds the threshold amount of data, determining another threshold amount of data based on one or more attributes of the query; and upon determining that the estimated amount of data change for the query does not exceed the other estimated amount of data change, adjusting the query such that execution of the query changes an amount of data within the database no greater than the other threshold amount of data change.

12. The system of claim 8, wherein determining the threshold amount of data to use in evaluating the query is further based on a user identifier associated with a user that issued the query to be executed.

13. The system of claim 8, further comprising:

receiving a second query to be executed against a database;

calculating an estimated amount of data that will be changed in executing the second query against the database;

determining a threshold amount of data based on one or more attributes of the second query;

upon determining that the estimated amount of data change for the second query exceeds the threshold amount of data, determining another threshold amount of data based on one or more attributes of the second query; and upon determining that the estimated amount of data change for the second query does not exceed the other estimated amount of data change, halting execution of the second query and scheduling the second query to be processed at a later time.

14. The system of claim 8, wherein determining the threshold amount of data change further comprises:

determining a time the query is received; and scaling the threshold amount of data change, based on the determined time.

15. A computer program product for managing the execution of a query, comprising:

a computer-readable storage medium having computer readable program code embodied therewith, wherein the computer readable program code, when executed, is configured to perform an operation comprising:

receiving, at a database management system (DBMS), a query to be executed against a database;

calculating, by a query governor component of the DBMS, an estimated amount of data within the database that will be changed in executing the query against the database;

determining a threshold amount of data to use in evaluating the query, based on a query type of the query, wherein the query type is one of a plurality of predefined query types recognized by the DBMS;

upon determining, by the query governor component, that the estimated amount of data change for the query does not exceed the threshold amount of data, beginning execution of the query against the database;

during execution of the query, calculating an updated amount of data that has been changed during execution of the query; and upon determining that the updated amount of data change exceeds a second threshold amount of data change, halting execution of the query.

* * * * *